(12) United States Patent
Klimm (10) Patent No.: US 10,021,991 B2
(45) Date of Patent: Jul. 17, 2018

(54) ELECTROMOTIVE FURNITURE DRIVE

(71) Applicant: DewertOkin GmbH, Kirchlengern (DE)

(72) Inventor: Hartmut Klimm, Bünde (DE)

(73) Assignee: DEWERTOKIN GMBH, Kirchlengern (DE)

( * ) Notice: Subject to any disclaimer, the term of this patent is extended or adjusted under 35 U.S.C. 154(b) by 258 days.

(21) Appl. No.: 14/418,836

(22) PCT Filed: Jul. 30, 2013

(86) PCT No.: PCT/EP2013/065991
§ 371 (c)(1),
(2) Date: Jan. 30, 2015

(87) PCT Pub. No.: WO2014/020018
PCT Pub. Date: Feb. 6, 2014

(65) Prior Publication Data
US 2015/0289665 A1     Oct. 15, 2015

(30) Foreign Application Priority Data

Aug. 2, 2012 (DE) .................. 10 2012 107 102

(51) Int. Cl.
| | | |
|---|---|---|
| *F16H 27/02* | (2006.01) | |
| *F16H 29/02* | (2006.01) | |
| *F16H 29/20* | (2006.01) | |
| *A47C 20/04* | (2006.01) | |
| *F16H 19/04* | (2006.01) | |

(Continued)

(52) U.S. Cl.
CPC .......... *A47C 20/046* (2013.01); *A47C 20/041* (2013.01); *F16H 19/04* (2013.01); *F16H 1/16* (2013.01); *F16H 25/2015* (2013.01)

(58) Field of Classification Search
CPC ..... A47C 20/046; A47C 20/041; A47C 1/025; A47C 1/03233; A47C 3/265; A47C 20/08; F16H 19/04; F16H 19/043; F16H 25/2015; F16H 2025/2034; F16H 55/26; F16H 55/28; F16H 1/16; B60N 2002/0236;
(Continued)

(56) References Cited

U.S. PATENT DOCUMENTS

| | | |
|---|---|---|
| 3,992,956 A | 11/1976 | Fischer |
| 5,176,353 A | 1/1993 | Aihara et al. |

(Continued)

FOREIGN PATENT DOCUMENTS

| | | |
|---|---|---|
| DE | 199 20 672 A1 | 12/2000 |
| DE | 101 24 316 A1 | 12/2002 |
| JP | H 02-43519 | 3/1990 |

OTHER PUBLICATIONS

International Search Report issued by the European Patent Office in International Application PCT/EP2013/065991.

(Continued)

*Primary Examiner* — Jake Cook
(74) *Attorney, Agent, or Firm* — Henry M. Feiereisen LLC (57) ABSTRACT

An electromotive furniture drive with a guide path and an output unit which moves along the guide path and which at least partly surrounds the guide path. The guide path has a gear rack, and the output unit has a drive motor with a speed-reducing mechanism and an output gear which is in engagement with the gear rack of the guide path.

12 Claims, 11 Drawing Sheets

(51) Int. Cl.
*F16H 1/16* (2006.01)
*F16H 25/20* (2006.01)

(58) Field of Classification Search
CPC .... B60N 2/072; B60N 2/0232; H01H 19/183; F16C 29/005
See application file for complete search history.

(56) References Cited

U.S. PATENT DOCUMENTS

| | | | | |
|---|---|---|---|---|
| 5,390,557 A * | 2/1995 | Tsukada | ............... | B25J 9/026 384/45 |
| 5,492,414 A * | 2/1996 | Gilbert | ............... | F16C 29/04 384/25 |
| 5,735,214 A * | 4/1998 | Tsuboi | ............... | F16C 29/045 104/106 |
| 6,098,342 A * | 8/2000 | Bischof | ............... | E05D 15/0608 49/409 |
| 6,367,199 B2 * | 4/2002 | Sedlak | ............... | E05F 15/619 296/56 |
| 6,427,546 B2 * | 8/2002 | Alber | ............... | F16C 29/008 384/15 |
| 6,557,601 B1 * | 5/2003 | Taylor | ............... | B27B 27/02 144/253.1 |
| 6,736,541 B2 * | 5/2004 | Kamimura | ............... | F16C 29/041 384/47 |
| 6,764,640 B1 * | 7/2004 | Talkington | ............... | B23K 7/002 266/48 |
| 7,069,695 B2 * | 7/2006 | Hattori | ............... | E05F 15/63 296/146.4 |
| 7,686,342 B2 * | 3/2010 | Jennings | ............... | E21B 17/085 285/323 |
| 8,152,492 B2 * | 4/2012 | Beck | ............... | F04B 47/02 417/415 |
| 2007/0051047 A1 | 3/2007 | Taubmann et al. | | |
| 2008/0245165 A1 * | 10/2008 | Wang | ............... | F16H 25/20 74/89.36 |
| 2010/0126073 A1 * | 5/2010 | Schroeder | ............... | B66B 13/08 49/118 |
| 2010/0129013 A1 * | 5/2010 | Schroeder | ............... | F16C 29/045 384/45 |
| 2011/0100141 A1 * | 5/2011 | Inoue | ............... | F16H 25/2015 74/25 |
| 2011/0198894 A1 | 8/2011 | Hsieh et al. | | |

OTHER PUBLICATIONS

European Search Report dated Sep. 20, 2017 with respect to counterpart European patent application EP 17 18 1517.

Translation of European Search Report dated Sep. 20, 2017 with respect to counterpart European patent application EP 17 18 1517.

* cited by examiner

ELECTROMOTIVE FURNITURE DRIVE

CROSS-REFERENCES TO RELATED APPLICATIONS

This application is the U.S. National Stage of International Application No. PCT/EP2013/065991, filed on Jul. 30, 2013, which designated the United States and has been published as International Publication No. WO 2014/020018 and which claims the priority of German Patent Application, Serial No. 10 2012 107 102.0, filed on Aug. 2, 2012 pursuant to 35 U.S.C. 119(a)-(d).

BACKGROUND OF THE INVENTION

The invention relates to an electromotive furniture drive with a guideway and an output unit which moves along the guideway and which at least partly surrounds the guideway.

Electromotive furniture drives, which are also referred to below in short as "drives", are installed in reclining and seating furniture in order to enable the convenient adjustment of furniture parts such as seats, backrests, footrests etc relative to a base body of the piece of furniture and relative to each other.

Adjustable seating furniture, especially so-called television armchairs or relaxation chairs, usually comprise a furniture fitting which is mechanically relatively complex and which allows a complex sequence of movements of the different cushion units mounted thereon in cooperation with a plurality of levers and rod assemblies.

An electromotive furniture drive which is suitable for use in such a seating furniture fitting is described in the specification US 2011/01 98 894 A1. The drive comprises a base element which is fixed longitudinally in the seating direction to a base frame of the furniture fitting. The base element provides a guideway, along which an output unit of the drive is moved. The output unit, also called power take-off unit, performs a linear displacing movement in relation to the motor which is arranged in a stationary manner on the drive, which linear displacing movement is transferred via a swivel lever as a combined displacement/rotational movement to a cross member of the seating furniture fitting. The movement of the drive element occurs via a rotary spindle which is rotatably mounted in the base element of the drive and is driven by a motor. The disadvantageous aspect is the relatively complex configuration of the base element, which carries the drive motor, optionally the gear elements and the rotary spindle. Base elements are required in different lengths for different purposes, e.g. for use in different seating furniture fittings, the provision of which is expensive as a result of the complex configuration of the base element.

A height-adjustable pillar is known for the motorisation of height-adjustable pieces of furniture, especially tables, from the specification DE 10 12 43 16 A1, in which a carriage is displaceably arranged in a tube. A motor for moving the carriage is displaced with the carriage within the tube. Two parallel gear racks are arranged in the interior in the tube, into which engage two gearwheels which are rotatably mounted on the carriage and are driven by the motor. The wall of the tubes comprises a longitudinal slot through which output elements can be fixed for connection with the height-adjustable furniture part on the moved carriage. It is also disadvantageous in such a furniture fitting that the tube which provides the guideway for the output element has a complex configuration and a large diameter because it accommodates the motor. Furthermore, the drive element can only be reached from one side through the slot. In applications however it is necessary to provide a connection on both sides of connection elements for the furniture fitting to the drive element.

SUMMARY OF THE INVENTION

It is therefore an object of the present invention to provide an electromotive drive of the kind mentioned above which comprises a base unit which can be adjusted with respect to its length in a simple manner and an output unit which can be accessed as well as possible and can be moved along the base unit.

This object is achieved by an electromotive furniture drive with the features of the independent claim. Advantageous embodiments and further developments are provided in the dependent claims.

An electromotive furniture drive in accordance with the invention and of the kind mentioned above is characterized in that the guideway comprises a gear rack, and the output unit comprises a drive motor with a speed-reducing mechanism and an output gear which is in engagement with the gear rack of the guideway. A furniture drive is provided in this manner which can be equipped easily, in combination with the same configuration, with guideways of different length and thus paths of displacement of different length. Since the guideway is surrounded at least in part, good guidance is ensured. The output unit lies outside of the guideway and is therefore not limited with respect to its arrangement and size by the configuration of the guideway.

The guideway preferably comprises a guide profile which comprises an especially C-shaped groove in an especially preferred manner for accommodating the gear rack. The gear rack can also be arranged integrally with the guide profile in an alternative embodiment.

A guideway for a counter bearing is arranged adjacent to the gear rack in an advantageous embodiment of the furniture drive, which counter bearing mounts the output gear directly or indirectly. As a result, meshing forces which act between the gear rack and the drive gear can be introduced directly into the guide profile. For this purpose, the gear rack can extend along one side of the guideway and a contact edge for the counter bearing can be arranged on a side of the guideway which is opposite of the gear rack. Alternatively, the cross-sectional shape of the guide profile can have a U-shaped section, wherein the gear rack is provided within the U-shaped section. A track is provided in one embodiment on a free leg of the U-shaped section adjacent to the gear rack for example.

In a further advantageous embodiment of the furniture drive, a bearing pin, through which the output gear is mounted, is fixed to a housing of the output unit. The bearing pin can be arranged integrally at one end with a housing and cooperate at the other end with a counter bearing, thus enabling a compact configuration of the output unit with few individual elements.

If counter bearing of the drive gear in the track adjacent to the gear rack does not occur, the bearing pin can alternatively be fixed at both ends in the housing of the output unit.

In a further advantageous embodiment of the furniture drive, the output unit comprises fastening means on at least one, preferably two, opposite sides for fastening to a furniture part or a part of a furniture fitting.

A worm gear with a worm connected to the drive motor and a worm wheel connected to the output gear can advantageously be provided as a speed-reducing mechanism. As a result, a high reduction ratio is achieved in combination with a simple configuration and simultaneous automatic locking.

Limit switches or limit stops are provided in a further advantageous embodiment of the furniture drive in order to prevent a movement of the output unit beyond the ends of the guideway. Switching cams are arranged on the guideway for actuating the limit switches. At least one of the switching cams can be arranged on a rider which is displaceable along the guideway, thus allowing the end position of the output unit to be set in a variable fashion.

Finally, a carpet shield which can be attached to the furniture drive can be provided, which shields the furniture drive in a downward direction at least in the region of a displacing movement of the output unit. The carpet shield ensures that threads of a shaggy carpet cannot reach the drive mechanism. It further prevents grinding tracks of the output unit in the case of a furniture drive that is installed in the piece of furniture at a very low level and dripping of grease or the like out of the furniture drive.

BRIEF DESCRIPTION OF THE DRAWING

The invention will be explained below in closer detail by reference to embodiments shown in the drawings, wherein.

DETAILED DESCRIPTION OF PREFERRED EMBODIMENTS

Figure 1A:
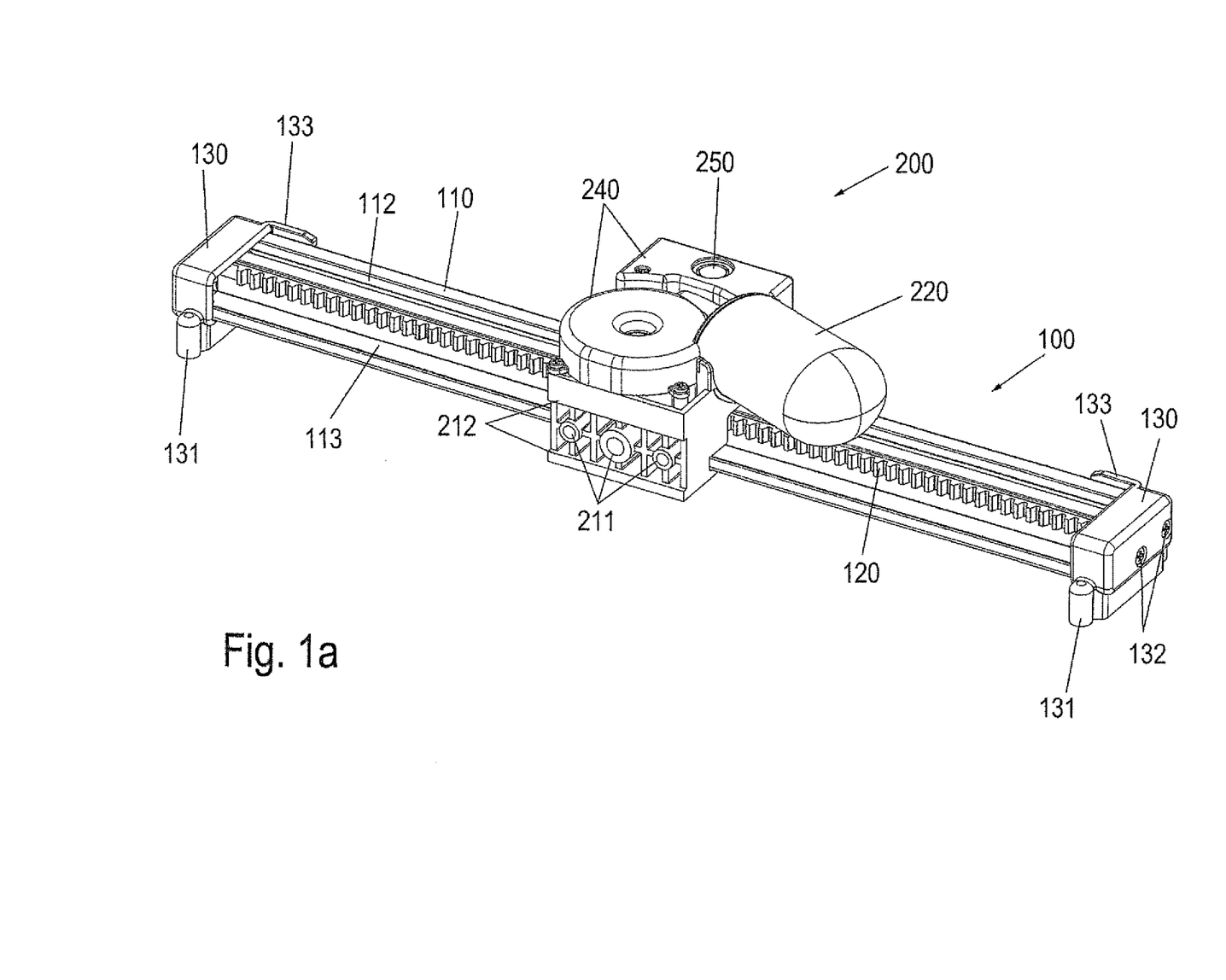
FIGS. 1a to 1c respectively show perspective views of an electromotive furniture drive in schematic, partly sectional views.

FIG. 1a shows an electromotive furniture drive in a perspective view. The furniture drive is arranged as a linear drive with a guideway 100 which is straight in this case and along which an output unit 200 can be displaced.

The guideway 100 is substantially formed in this embodiment by a guide profile 110 which has an approximately rectangular cross-section.

Figures 1B, 1C:
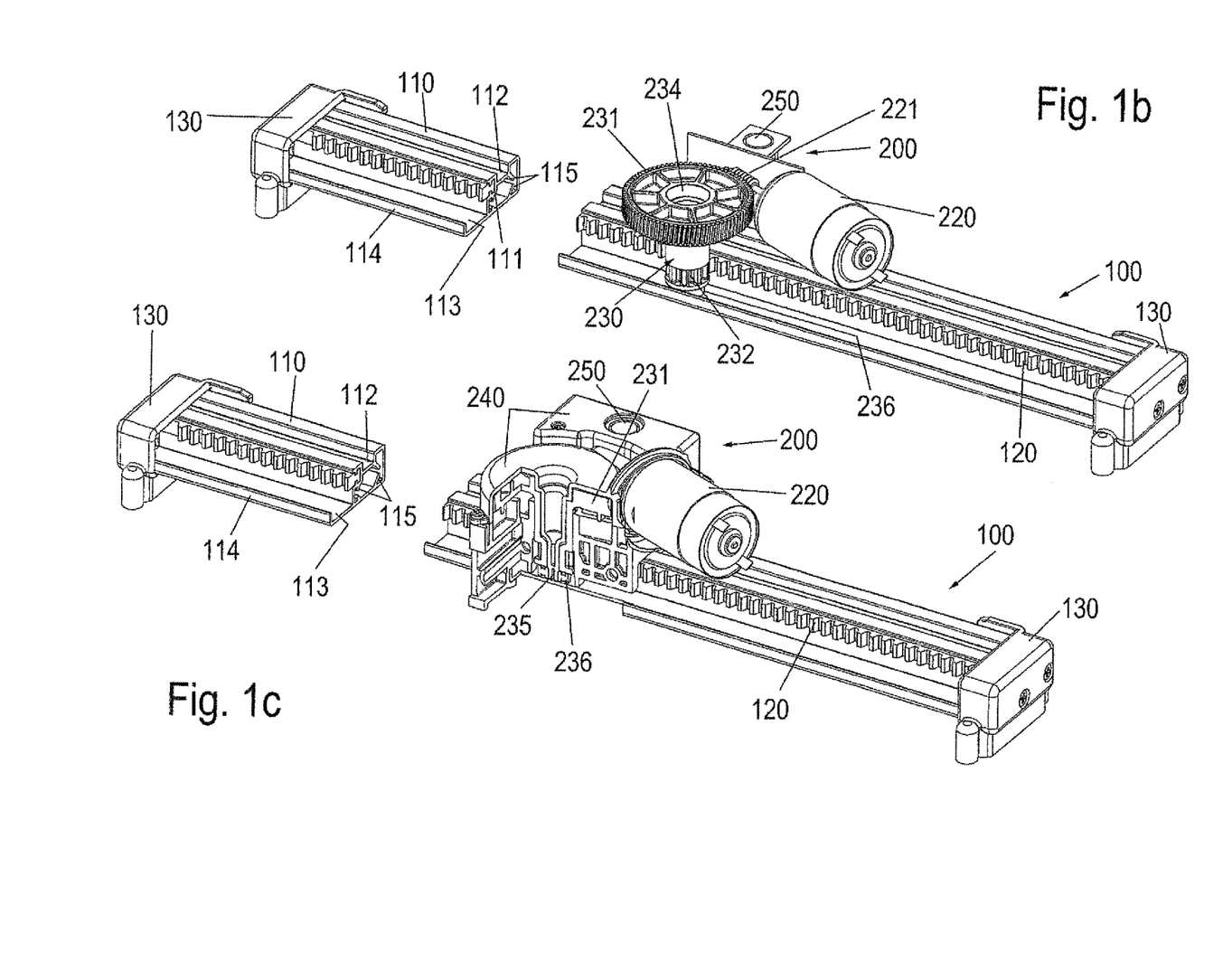
Figure 2:
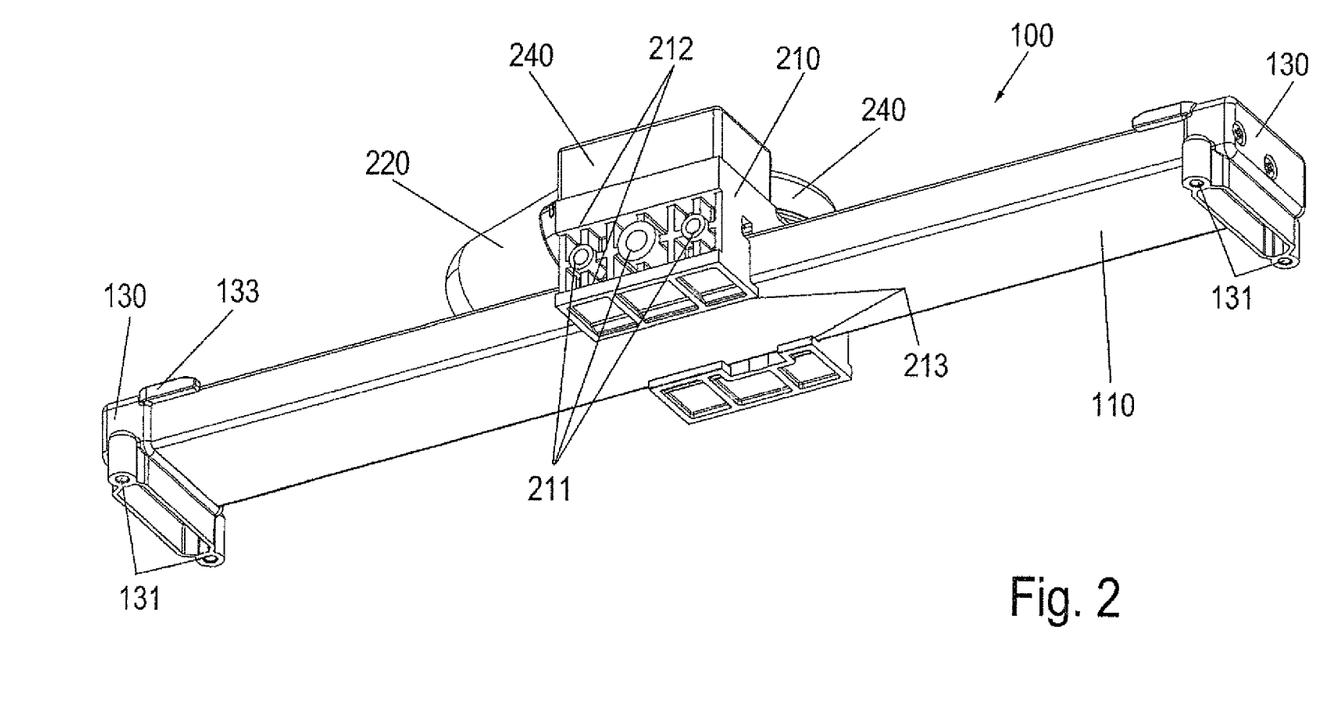
FIG. 2 shows a further perspective view of the electromotive furniture drive of the first embodiment.

FIGS. 1b and 1c show the electromotive furniture drive of FIG. 1a with an intersected guide profile 110. Furthermore, the elements of the output unit 200 are removed (FIG. 1b) or shown in a sectional view (FIG. 1c) in order to illustrate the inner configuration of the drive unit 200. FIG. 2 shows the bottom side of the electromotive furniture drive in a perspective view.

The guide profile 110 is preferably an aluminium profile. It can also be arranged as a plastic profile for specific applications in which displacement forces that are not too high are applied by the drive or bending forces that are not too high need to be absorbed by the drive. The sectional view of the guide profile 110 shows that the profile comprises a groove 111 for accommodating a gear rack 120. The groove 111 for accommodating a gear rack 120 is arranged in a C-shaped manner, wherein the gear rack 120 comprises a respective complementary profile on its side opposite of the set of teeth, so that the gear rack 120 can be inserted into the groove 111. The gear rack 120 can be made with a respective profile made of a hard durable plastic for example. The gear rack 120 can concern an extruded profile with a milled set of teeth or also an element produced in its entirety by way of an injection-moulding method. The gear rack 120 can be arranged integrally or also in several parts. The production of a respectively long integral extruded profile can be problematic, especially in the case of a furniture drive with long paths of travel. A multi-part gear rack 120 is advisable in such a case.

A guide groove 112 is further arranged on the side of the guide profile 110 on the side shown at the top in the drawing. A track 113 for a counter bearing is provided adjacent to the groove 111 for accommodating the gear rack 120. The track 113 is closed off by means of a contact edge 114 arranged parallel to the groove 111 on the side opposite of the gear rack 120. The function of the counter bearing will be explained below in connection with the detailed description of the output unit 200. As is shown in FIGS. 1b and 1c, stiffening ribs 115 can be arranged within the guide profile 110.

It is covered with fastening flanges 130 at both ends of the guide profile 110. The fastening flanges 130 provide a fastening means 131, which are in form of threaded holes in this case. The guideway 100 and thus the electromotive drive can be fixed by way of the fastening means 131 to the piece of furniture, e.g. to the furniture fitting. The fastening flanges 130 are connected via screws 132 or other fastening means to the guide profile 110. The screws 132 can be self-tapping screws for example which are screwed into suitable chambers or onto suitable webs or walls of the guide profile 110. Such suitable chambers or webs are defined for example by the stiffening ribs 115. Switching cams 133 are further arranged on the fastening flanges 130, which switching cams cooperate with limit switches that are not shown in this drawing and will be explained below in closer detail. The gear rack 120 inserted into the guide profile 110 is also fixed by the fastening flanges 130.

The output unit 200 comprises a slide 210 as a housing part and base element, which slide is arranged as an injection-moulded part in an integral fashion in form of an approximately C-shaped block which engages around the guide profile 110 at least in part and runs along the outside of the guide profile 110 in this respect. On the bottom side of the slide 210 it comprises sections 213 which engage partly beyond the bottom side of the guide profile 210 and thus prevent that the output unit 200 can be removed upwardly from the guideway 100. Alternatively or in addition, the guide groove 112 can be arranged for this purpose as a dovetail groove or as a groove with a T-shaped or L-shaped cross-section. In accordance with this alternative or additional embodiment of at least a partial area of the guideway 100, it thus comprises a guide profile 110 into which the slide 210 engages at least in part.

In an alternative embodiment, the slide 210 can be arranged in several parts, wherein it consists of at least two sections and at least one section is arranged as a guide section for guidance on the guide profile 110, as a fastening section for fastening via a fastening means 211, 212, as a receiving section for the mechanism, or as a bearing section for the gear components of the mechanism such as the worm 221, the drive shaft 230, the worm gear 231, and the output gear 232.

The shaping of the slide 210 on its surface facing the guide profile 110 is respectively adjusted to said profile, so that the slide 210 is displaceably mounted along the guide profile 110 with as little play as possible or with a low amount of play and in a twist-proof manner with respect to all axes. Fastening means 211 for the direct or indirect connection with a furniture part such as a furniture fitting is provided on at least one side, preferably two opposite sides, of the slide 210.

Three boreholes are provided as fastening means 211, of which at least one central borehole, e.g. the larger one, is provided with a thread. Furthermore, two parallel edges which protrude with respect to the boreholes are provided as further fastening means 212. A plate provided with a central borehole and two pins can be inserted for example between the further fastening means 211 for connection with the piece of furniture or furniture fitting, wherein the two pins are inserted into the outer boreholes and the fastening means 211, and a screw is inserted into the middle threaded hole of the fastening means 211. The edges, as the further fastening means 212, additionally prevent twisting of the inserted plate in addition to the inserted pins. It could also be considered to use a joint for example which is fixed with the fastening means 211 to the slide 210, or a fastening means 211 which comprises or forms a joint. It is understood that fastening means other than those shown here in can be used for connecting the slide 210 to the piece of furniture or furniture fitting.

A drive motor 220 is fixed to the slide 210 for moving the slide 210. The elements required for power transmission from the drive motor 210 to the guide profile 110 are shown in an exposed way in FIG. 1b.

A worm 221 is placed on an output shaft of the motor 220. A drive shaft 230 is provided with a worm gear 231, which is in engagement with the worm 221 and which is connected in a torsion-proof manner to an output gear 232 which is in engagement with the gear rack 120. The drive shaft 230 is at least partly hollow, so that a bearing receiver 234 is formed at least in the region of the worm gear 231 but preferably also lower protruding into the drive shaft, by means of which the drive shaft 230 can be mounted at least at its end which is the upper one in the drawing. The worm gear 231 and the drive gear 232 can be arranged in an integral manner, but can also be separate components which then preferably engage in an interlocking manner into each other.

In the embodiment shown here, the drive shaft 230 is arranged in a hollow manner over its entire length and is rotatably placed on a bearing pin over its entire length. The bearing pin is fixed to a gear housing 240 which is screwed onto the slide 210 (see FIGS. 1a, 1c). The bearing pin can be arranged on this upper side in an integral manner with the gear housing 240.

The slide 210 and the gear housing 240 jointly also form a housing of the output unit. They can also be regarded jointly as a multi-part gear housing.

The bearing pin protrudes out of the drive shaft 230 at the opposite bottom end, i.e. adjacent to the output gear 232. The bearing pin 235 comprises a bearing journal at this bottom end, which is shown in FIG. 1c for example. Said bearing journal is mounted in a counter bearing 236 which runs in the track 213 as described above. It is alternatively possible that that the drive shaft 230 is not arranged in a hollow manner of its entire length and the bearing pin 235 does not protrude from the drive shaft 230 at the bottom end. The bearing pin 235 can be arranged therein on the drive shaft 230 and the drive shaft 230 can be mounted at this side directly in the counter bearing 236.

During the operation of the motor 220, its rotational movement is reduced via the worm 221 and the worm gear 231 and transmitted in an optionally self-locking manner to the drive shaft 230. The interaction of the drive gear 232 and the gear rack 120 converts the rotational movement of the drive shaft 230 into a linear movement of the slide 210 along the guide profile 110. The counter bearing 236 is provided in order to enable the absorption of the forces (meshing forces) which press the gearing apart during the engagement of the worm 221 in the worm gear 231 and especially during the engagement of the output gear 232 in the gear rack 120. Especially large forces occurring between the output gear 232 and the gear rack 120 are supported by the counter bearing 236 on the contact edge 114 of the guide profile 110. In the present case, the counter bearing 236 is arranged as a radial ball bearing. Instead of the illustrated radial ball bearing as the counter bearing 236, it can also use a roller or a bearing block which is displaceable in the track 113. It is also possible to guide the counter bearing 236 not directly in the track 113, but to support it in the slide 210, which rests on its part on the guide profile 110 and/or on the gear rack 120.

Figure 3:
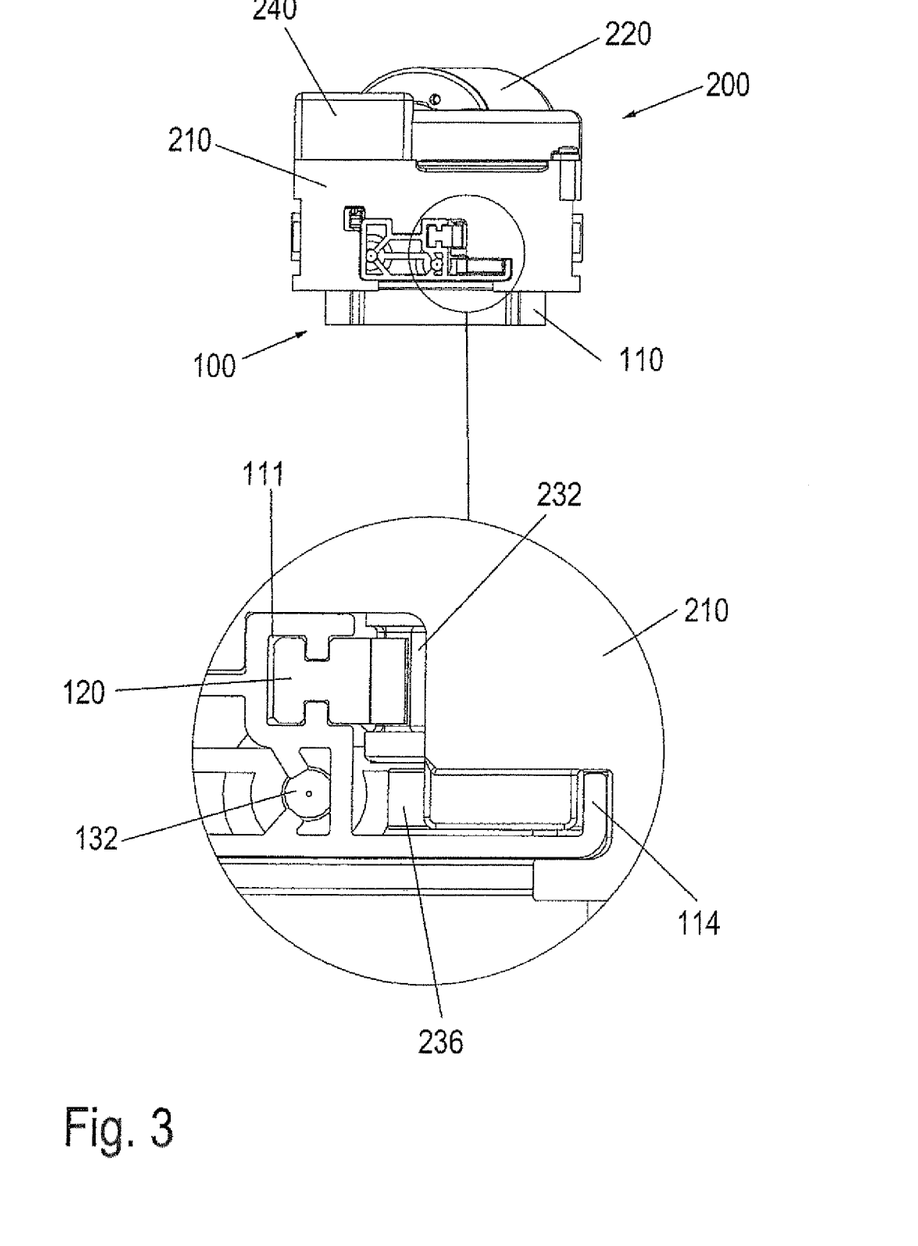
FIG. 3 shows a further sectional and detailed view of the electric furniture drive of the first embodiment.

FIG. 3 shows in the upper region a sectional view performed perpendicularly to the longitudinal direction of the guideway 100 through the electromotive drive. In the detailed enlargement in the bottom region of the drawing, the counter bearing resting on the contact edge 114 of the track 112 is shown in closer detail. The illustration further shows how the thread of the screw 132 of the fastening flange 130 taps into the chamber formed by the stiffening ribs 115 of the guide profile 110.

Figures 4A, 4B:
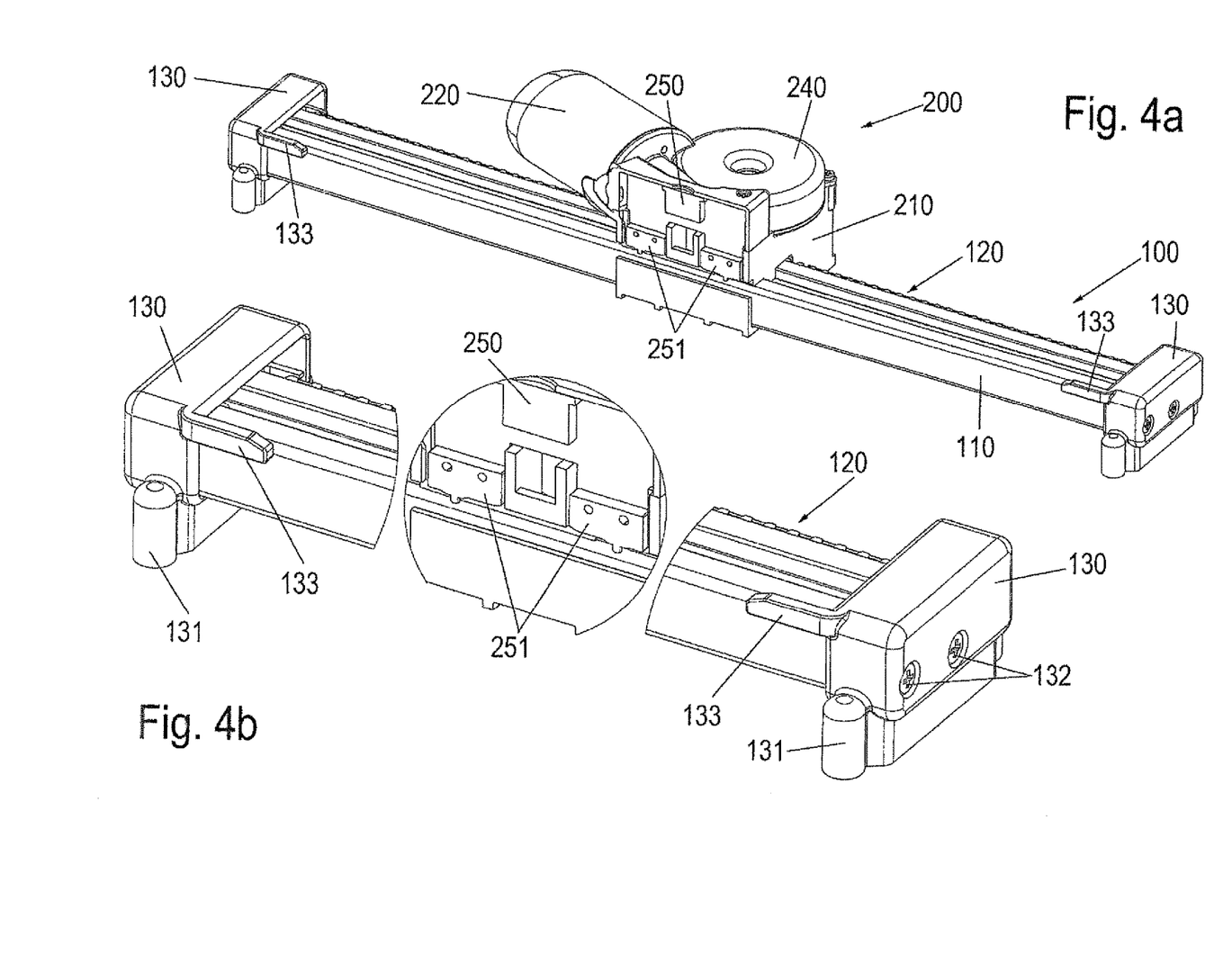
FIGS. 4a and 4b show further perspective sectional and detailed views of the electromotive furniture drive of the first embodiment.

FIG. 4a shows a further perspective and sectional view of the electromotive drive of FIG. 1. In contrast to the illustration of FIG. 1, the illustration here shows the gear rack 120 of the opposite side. The slide 210 is shown in a sectional view. An electrical connection 250 is arranged beneath the upper side of the gear housing 240, by way of which the electromotive drive is supplied with power. This electrical connection is also shown in FIGS. 1a to 1c. It can be arranged as a fixed cable connection or as a plug connection.

Two limit switches 251 are arranged on the slide 210. The limit switches 251 can be mechanical switches such as microswitches in the illustrated embodiment. It is alternatively also possible to use optical switches such as fork light barriers or reflected-light barriers in connection with a respective electronic control system. The limit switches 251 are arranged in such a way that they are actuated by the respective switching cams 133 that are arranged on the fastening flange 130 at the end of the guide profile 110 when the output unit 200 travels to the end region of the guide region 110. The limit switches 251 are connected to the electrical connection 250 and the drive motor 220 in such a way that further travel of the output unit 200 in the direction of an actuated limit switch 251 is prevented. The limit switches 251 are preferably incorporated for this purpose in the electrical supply circuit of the drive motor 220 and open the electrical supply circuit when switching is performed in the respective end region of the guide profile 110 or the guideway 100.

FIG. 4b again shows the limit switches 251 and the switching cams 133 that cooperate with said switches in an enlarged view in detail.

Figures 5A, 5B:
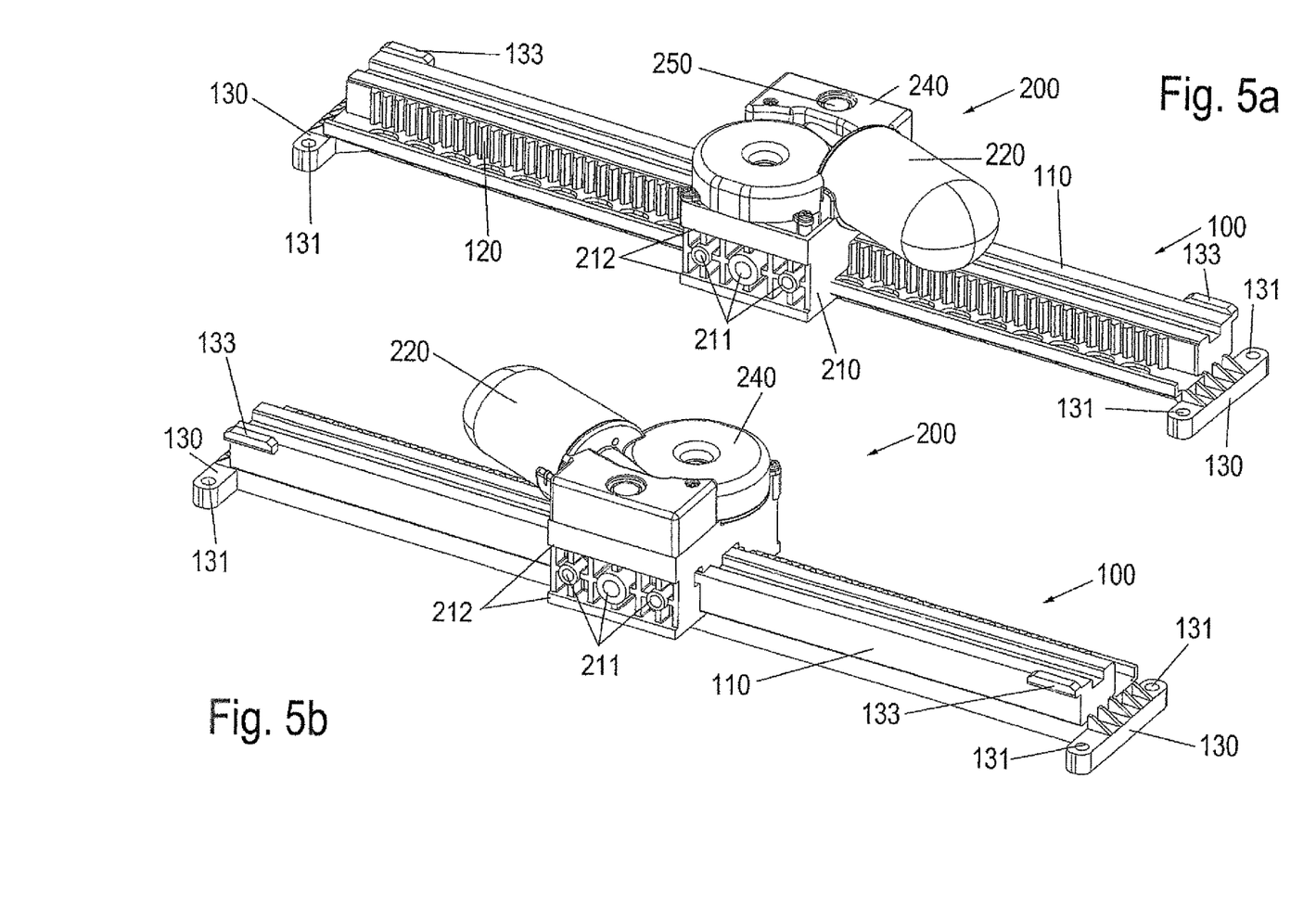
FIGS. 5a and 5b show respective views of an electromotive furniture drive in a second embodiment.
Figures 6A, 6B:
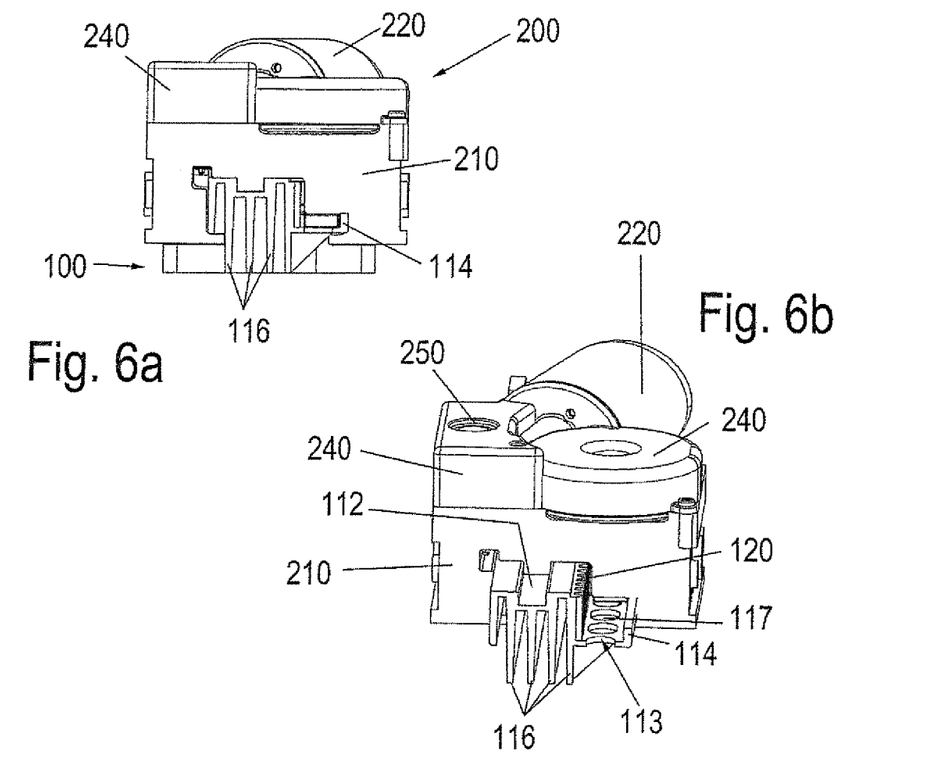
FIGS. 6a to 6c show various perspective and partly sectional views of the electromotive furniture drive in the second embodiment.
Figure 6C:
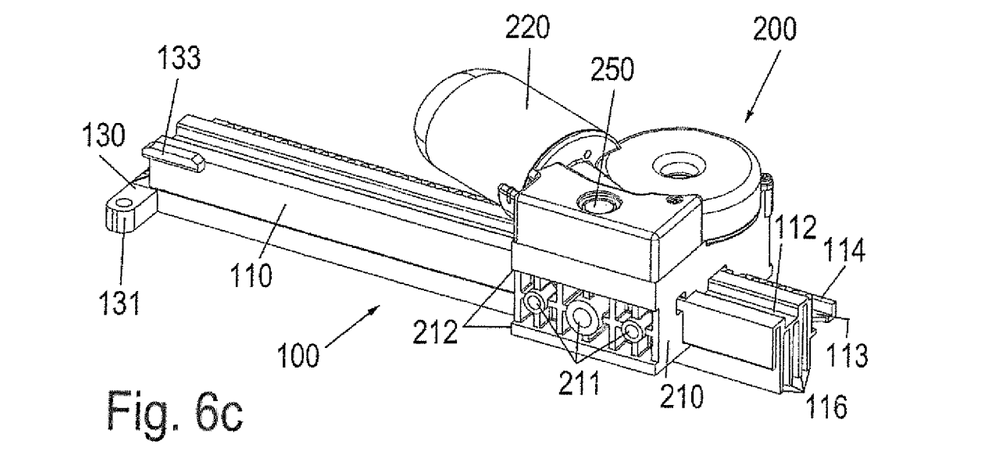
Figure 7:
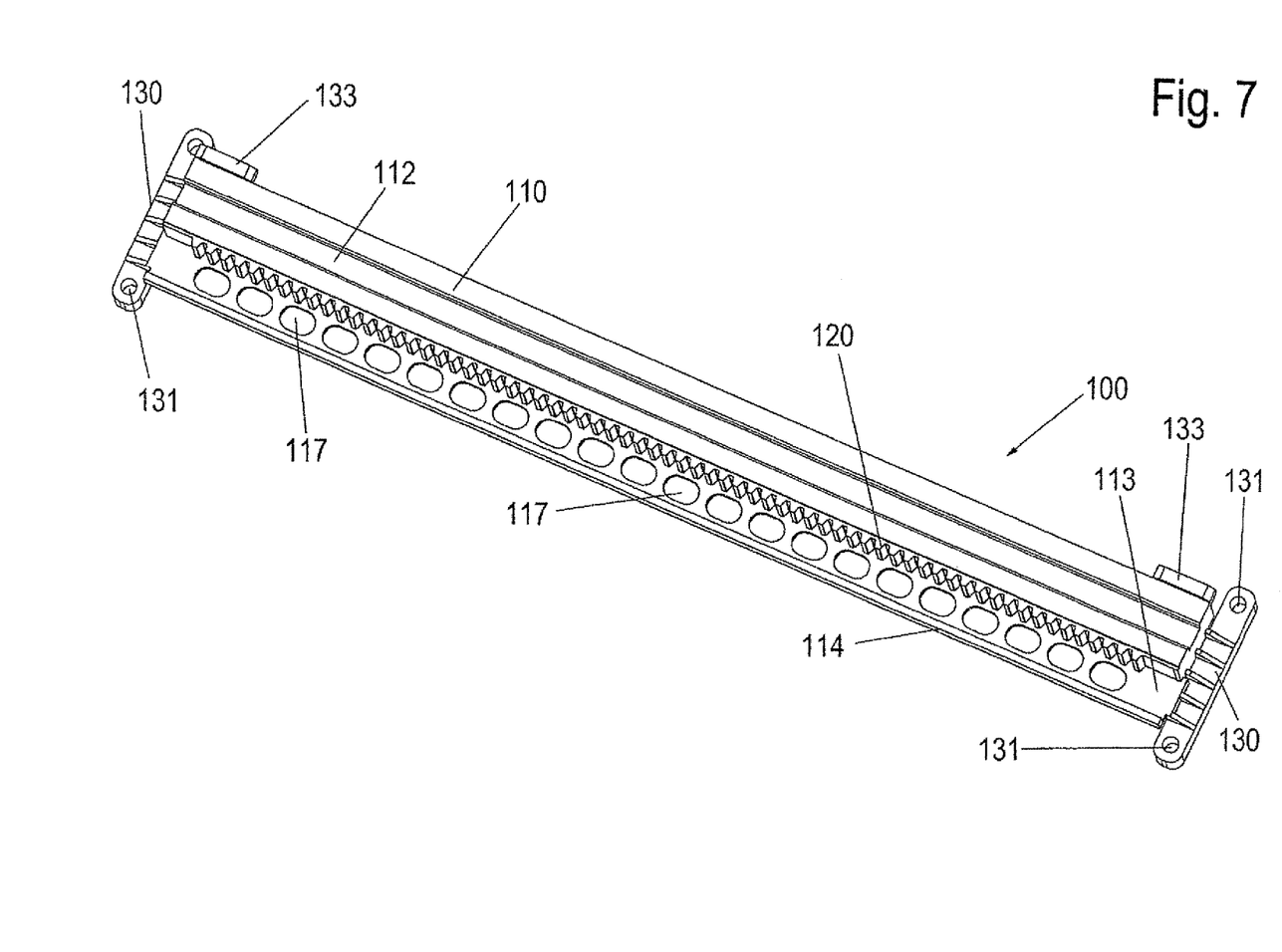
FIG. 7 shows a perspective view of the guideway of the electromotive furniture drive in the second embodiment.

FIGS. 5*a* and 5*b* as well as 6*a* to 6*c* show a further embodiment of an electromotive drive. FIG. 7 also shows a perspective view of the guide profile used in this embodiment. The same reference numerals designate the same elements or similarly acting elements in these drawings as in the preceding drawings. Reference is hereby made to the explanations of the first embodiment concerning the fundamental configuration of this electromotive furniture drive in the second embodiment.

In contrast to the first embodiment, the guide profile 110 is integrally arranged with the gear rack 120 in this embodiment.

The fastening flange 130 is also arranged integrally with the guide profile 110 in this embodiment. In a possible further development of this embodiment, the gear rack 120 can be arranged in such a way that it represents the guide profile 110 per se.

The guideway 100 is preferably made of plastic in an injection-moulding process. Other than in the guide profile 110 of the first embodiment, no hollow spaces are provided in the profile in this case so that the guideway 100 can be produced more easily by means of the injection-moulding method. For the purpose of increasing stability, rib structures are arranged in the bottom region. They are arranged in this case as longitudinal ribs 116. A further difference concerns the track 113 for the counter bearing 236. This track is provided with dust openings 117, through which dust accumulates in the track 113, which dust drops from furniture cushions onto the electromotive drive arranged in the interior of the piece of furniture. The penetration of dust into the drive region within the slide 210 is thus prevented or at least reduced, thus reducing the likelihood of blockage or increased wear and tear of the drive elements. A cover of the gear rack 120 can further be provided against the entry and penetration of foreign bodies or dust.

A gear step is formed in the two illustrated embodiments by the worm 221 and the worm gear 231 for speed reduction between the drive motor 220 and the output gear 232. It is understood that other types of gears such as a planetary gear, a spur gear or a friction gear or epicyclic gear are possible. A multistep gear can also be used instead of a single-step gear.

It is further possible that helical gearing can be used instead of straight gearing between the output gear and the gear rack. Gearing in the manner of a developed worm gear is also possible. A gear rack and gearing shall be understood in this respect as any shaping between an element (gear rack) extending along the guide track 110 and a rotating output element (output gear). The shaping can occur on a microscopic scale, so that a friction gear drive can be considered.

The guideway 100 is formed in a straight way in the illustrated embodiments. It is also possible to arrange the guideway 100 at least partly in an arc-shaped manner. The guideway 100 can follow the movement of a force introduction point of a furniture component or a moved part of the furniture fitting for example which is connected to the electromotive drive. It is further possible that the guideway 100 is part of the furniture fitting itself. The guideway 100 can be a straight or arc-shaped slide of a furniture fitting, which guideway is provided with the gearing on at least one side.

The slide 210 and the gear rack 120 are guided relative to each other according to the previously shown and described embodiments. The description of this arrangement can be explained so as to be reduced thereto, wherein the guide profile 110, which is in operative connection with the gearing of the gear rack 120, is guided to the output gear 232 which forms the gear output, and the guide or the guide profile 110 takes up at least the meshing forces of the gear rack meshing, so that the gear rack meshing remains in engagement. Furthermore, alternative gear rack profiles in the manner of a lantern gearing are formed. Furthermore, alternative gearings of the output gear 232 are formed in the manner of a chain wheel or in the manner of a lantern gear. It is relevant however that a linear gear which acts as a rack-and-pinion mechanism is formed.

The bearings of the individual gear wheels are explained in the descriptions above. The special configuration of gear housing 240 and slide 210 allows an especially simple accommodation and mounting of the gear members and the counter bearing 236, and is not limited to the illustrated embodiments. As a result, the bearing of the worm 221, the drive shaft 230, the worm gear 231, the output gear 232 can be arranged in alternative embodiments partly or fully in the gear housing 240 or at least partly or fully in the slide 210. Furthermore, the worm 221, the drive shaft 230, the worm gear 231, the output gear 232 can be accommodated in part or in full by the gear housing 240, and/or partly or fully by the slide 210. The aforementioned bearings and guides are arranged as plain bearings or slideways. Alternatively, at least a part of the bearings and guides comprise roller bearings in form of groove ball bearings.

As already described initially, a deactivation of the drive motor 220 occurs by the limit switch 251, which is arranged as a microswitch for example. A different kind of deactivation comprises a reversible switch which is also arranged in the motor circuit and is formed by a motor current threshold switch, e.g. a polyswitch component. Mechanical limit stops are arranged as an alternative thereto, which are formed as follows for example: end of the gearing of the rack gearing; protrusion of a gearing section of the gear rack 120; by the fastening flange 130 which protrudes beyond the boundaries of the guideway 100; fastening screws of the furniture drive in the region of the fastening flange 130. Electrical limit switches can further be combined with mechanical limit stops.

Figure 8:
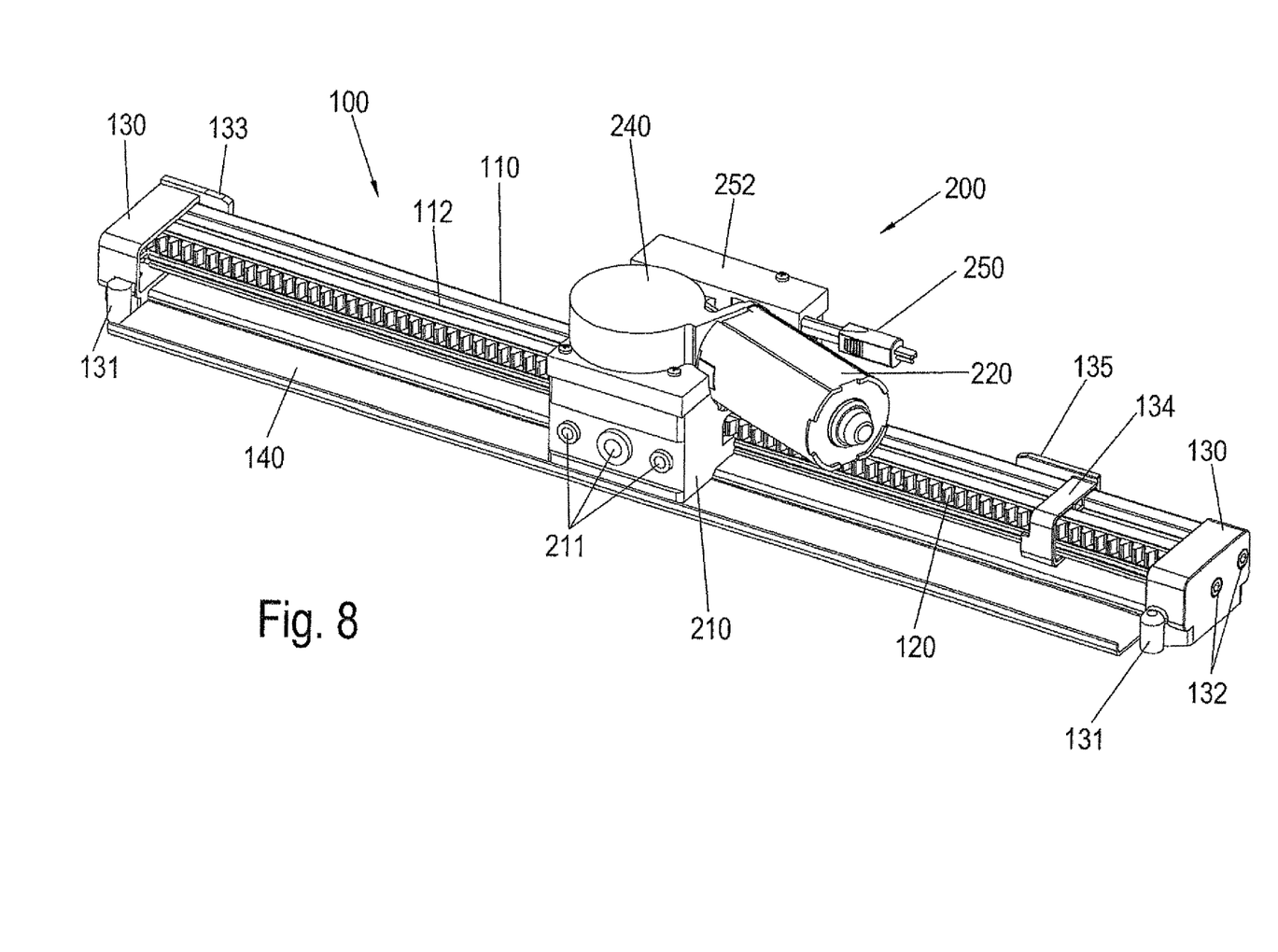
FIGS. 8 to 10 show various perspective views of an electromotive furniture drive in a third embodiment.
Figure 9:
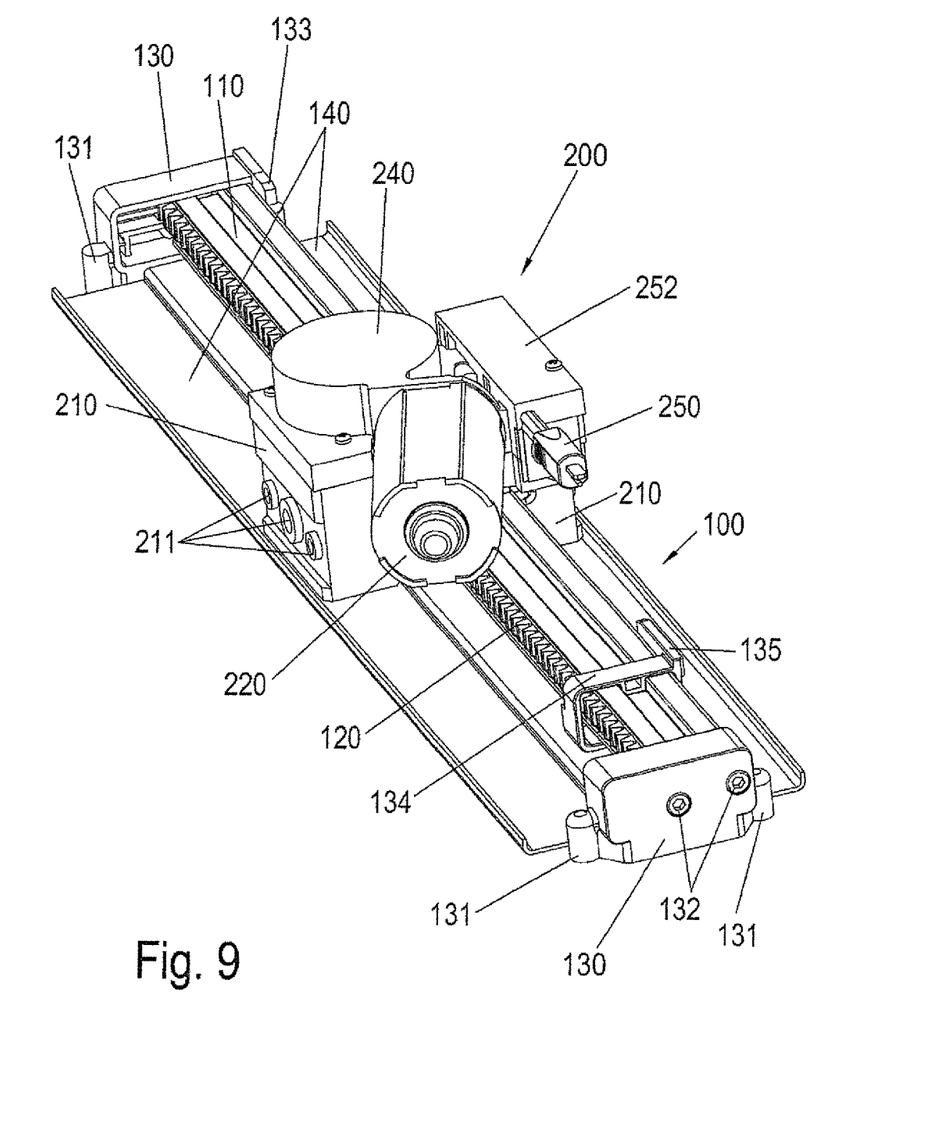
Figure 10:
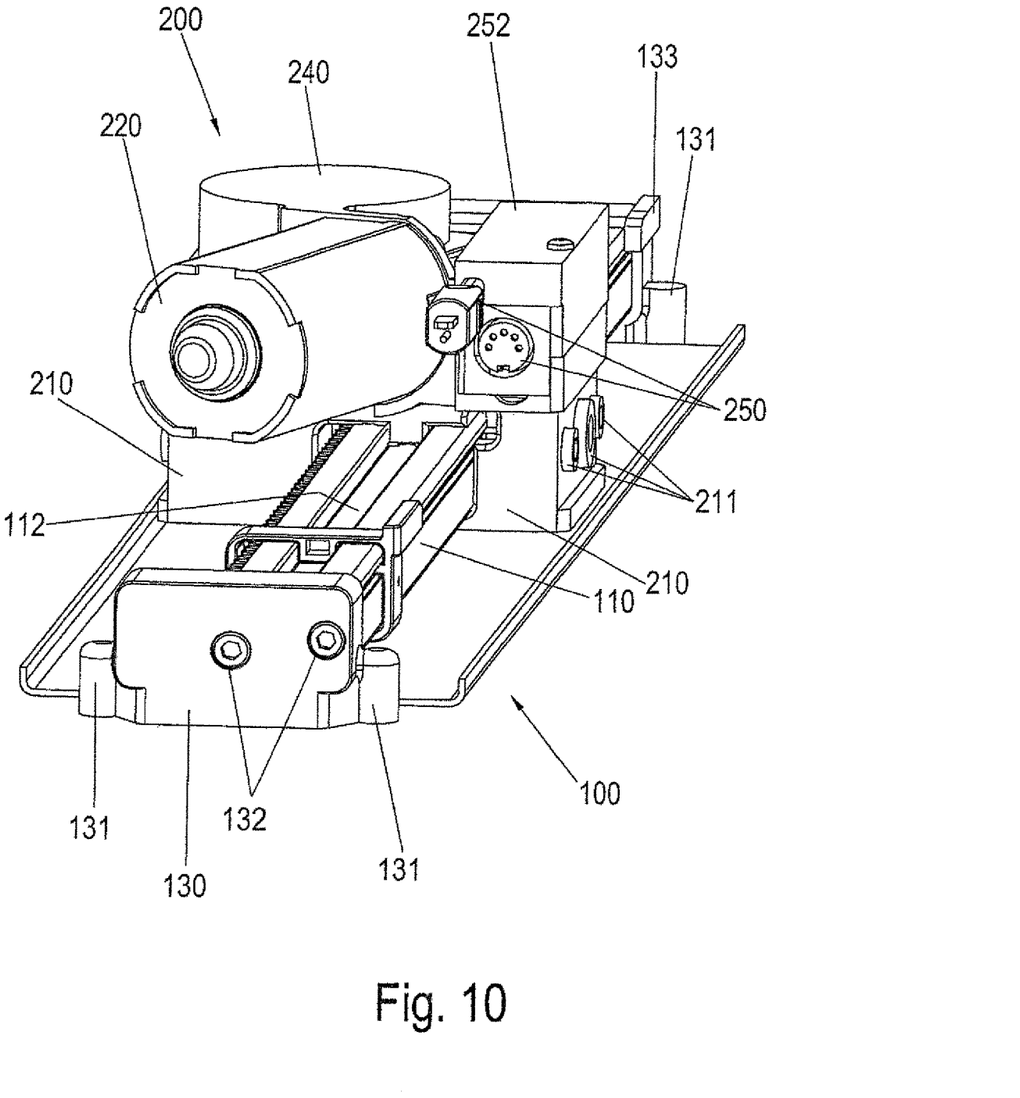

FIGS. 8 to 10 show a third embodiment of an electromotive drive. In these drawings, the same reference numerals designate the same elements or similarly acting elements as in the preceding drawings. Reference is made to the explanations of the first embodiment concerning the principal configuration of this electromotive furniture drive in the third embodiment.

In contrast to the first embodiment, the guide profile 110 does not comprise a separate track for the counter bearing at the bottom end of the drive shaft (not shown). Instead, the drive shaft is mounted at its two ends in the gear housing 210. As a result, higher meshing forces act by the engagement of the output gear (cf. 232 of FIG. 1*b*) in the gear rack 120. These forces are taken up by the gear housing 210 and taken up by the guide profile 110 on the side opposite of the gear rack 120. FIG. 10 shows in particular how the gear housing 210 surrounds the guide profile 110 for this purpose in the manner of a clamp. With the definition as mentioned above, it can also be regarded in such a way that a track for a counter bearing is provided adjacent to the gear rack 120, wherein one side of the guide profile 110 represents the track. In accordance with the embodiment according to FIG. 10, at least one track is provided which is arranged in a flat and smooth manner and extends in the longitudinal direction of the guide profile 110.

Plain bearings or roller bearings can principally be used as a bearing for the drive shaft. Roller bearings are advantageous however in order to keep friction losses as low as possible and to allow smaller drive motors 220 to be used.

The gear housing 240 does not cover the entire slide 210 in this embodiment, but only the part in which the mechanical drive elements are situated. A separate connection cover 252 is provided for the region of the electrical connections 250.

A further difference concerns the switching cam for the limit switch actuation, which switching cam is arranged on the right side in FIG. 8. It is not mounted in this case on the fastening flange, but in form of an adjustable switching cam 135 on a rider 134 which is displaceable along the guide profile 110. The end position of the slide 210 can be adjusted to the respective piece of furniture in this manner. The rider 134 can be provided with a fixing means, e.g. a (grub) screw, in order to fix it in its desired position. The rider 134 is alternatively arranged with a clamping apparatus or further as a clamp in order to connect the switching cam 135 to the guide profile 110. Contrary to the illustrations in the drawings and as an alternative, at least one further rider 134 can be provided so that a number of riders 134 with switching cams 135 are provided on the guide profile 110. The switching cams 135 which are arranged farthest away from each other are provided for end position deactivation. Every switching cam 135 which is arranged between the switching cams provided for end position deactivation is provided for an intermediate stop or an intermediate position. Depending on the embodiment, the switching cam 133, 135 can actuate a switch or move a transformer which actuates a switch. The drive unit 200 comprises at least one switch whose switching contact is incorporated in the electric circuit of the drive motor 220 or emits a switching signal to a higher-level control upon actuation.

A carpet protection rail 140 is further arranged in this embodiment beneath the guide rail 110, which protection rail prevents that threads of a shaggy carpet will reach the region between the drive gear and the gear rack 120. It further prevents grinding tracks of the slide 210 in the case of a furniture drive that is installed in the piece of furniture at a very low level and dripping of grease or the like out of the furniture drive. The carpet protection rail 140 is preferably clamped on or inserted into the furniture drive, and can thus be easily retrofitted. The carpet protection rail 140 is alternatively connected to the electromotive furniture drive if it is located in the installation position mounted in the piece of furniture.

Both the rider 134 with the adjustable switching cam 135 and the carpet protection rail 140 can also be used in the previously shown embodiments.

The invention claimed is:

1. An electromotive furniture drive, comprising:
a guideway comprising a guide profile and a gear rack;
an output unit configured to at least partly surround the guideway, said output unit having an output gear in engagement with the gear rack and a drive mechanism in driving relationship to the output gear,
limit switches or limit stops configured to prevent a movement of the output unit beyond ends of the guideway, and
at least one switching cam arranged on a fastening flange at an end of the guide profile for actuating the limit switches to prevent further travel of the output unit in a direction of the actuated limit switch,
wherein the drive mechanism includes a drive motor with a speed-reducing mechanism, and
wherein the guide profile comprises a groove for accommodating the gear rack.

2. The electromotive furniture drive of claim 1, wherein the groove has a C-shaped configuration.

3. The electromotive furniture drive of claim 1, wherein the gear rack is integrally formed with the guide profile.

4. The electromotive furniture drive of claim 1, further comprising a track arranged adjacent to the gear rack, and a counter bearing received in the track and configured to mount the output gear directly or indirectly.

5. The electromotive furniture drive of claim 4, wherein the gear rack extends along a side of the track, said track having another side extending in opposite relation to the gear rack and provided with a contact edge for the counter bearing.

6. The electromotive furniture drive of claim 1, further comprising a bearing pin fixed to a housing of the output unit supporting the output gear.

7. The electromotive furniture drive of claim 6, wherein the bearing pin has one end formed integrally with the housing of the output unit, and another end cooperating with a counter bearing.

8. The electromotive furniture drive of claim 6, wherein the bearing pin is fixed at both ends in the housing of the output unit.

9. The electromotive furniture drive of claim 1, wherein the output unit comprises a fastening member on at least one side of the output unit for fixing to a furniture part or a part of a furniture fitting.

10. The electromotive furniture drive of claim 1, wherein the output unit comprises fastening members on two opposite sides of the output unit for fixing to a furniture part or a part of a furniture fitting.

11. The electromotive furniture drive of claim 1, wherein the speed-reducing mechanism is configured as a worm gear having a worm connected to the drive motor, and a worm wheel connected to the output gear.

12. The electromotive furniture drive of claim 1, further comprising a carpet protection shield attachable to the electromotive furniture drive to shield the electromotive furniture drive in a downward direction at least in a region of a path of displacement of the output unit.

* * * * *